United States Patent
Desperben et al.

[11] Patent Number: 5,257,291
[45] Date of Patent: Oct. 26, 1993

[54] CIRCUIT FOR EVALUATING FREQUENCY DIFFERENCE

[75] Inventors: Lydie Desperben, Bois Colombes; Ouélid Abdesselem, Paris, both of France

[73] Assignee: Alcatel N.V., Amsterdam, Netherlands

[21] Appl. No.: 693,400

[22] Filed: Apr. 30, 1991

[30] Foreign Application Priority Data

May 4, 1990 [FR] France .................. 90 05660

[51] Int. Cl.$^5$ ............... H04L 27/14; H04L 27/22; H04L 27/06
[52] U.S. Cl. .......................... 375/83; 375/80; 375/97; 329/304
[58] Field of Search ............... 375/80, 83, 97; 329/304

[56] References Cited

U.S. PATENT DOCUMENTS

| | | | |
|---|---|---|---|
| 4,438,524 | 3/1984 | Muilwijk | 375/80 |
| 4,466,108 | 8/1984 | Rhodes | 375/97 |
| 4,527,278 | 7/1985 | Deconche et al. | 375/97 |
| 5,081,652 | 1/1992 | Farahati et al. | 375/97 |

Primary Examiner—Curtis Kuntz
Assistant Examiner—Vijay Shankar
Attorney, Agent, or Firm—Robbins, Berliner & Carson

[57] ABSTRACT

A digital cellular radiocommunication system includes a circuit for evaluating the frequency difference between a local signal and the carrier wave of a receive signal which are close together in frequency, the receive signal having been subjected to phase state modulation by a modulation signal and thus having a phase that includes a transmission phase shift, a modulation phase shift corresponding to one of a plurality of phase states, and a synchronization phase shift due to the frequency difference. The circuit produces samples of the receive signal from which the transmission phase shift has been eliminated, detects the modulation phase shift of the samples in order to eliminate it, produces the mean phase of a series of samples, and produce the frequency difference on the basis of the mean phase of at least two series of samples and on the basis of the time interval between the middles of the series.

9 Claims, 1 Drawing Sheet

CIRCUIT FOR EVALUATING FREQUENCY DIFFERENCE

The present invention relates to a circuit for evaluating frequency difference.

BACKGROUND OF THE INVENTION

Demodulation equipment receiving a receive signal constituted by a carrier wave modulated by a base band signal commonly includes a local oscillator producing a local signal which is used to perform frequency transposition into base band. It is necessary for the frequency difference between the carrier wave and the local signal to be known accurately so as to be able to recover the base band signal. Although the frequency of the local oscillator is designed to be equal to the frequency of the carrier wave, in practice it is slightly different therefrom.

The invention is thus applicable where two frequencies to be compared are close together. This applies, in particular, to the digital cellular radiocommunications system specified by the Special Mobile Group (GSM) that constitutes a part of the European Conference of Posts and Telecommunications Administrations (CEPT), in which a mobile terminal receives a base band receive signal which is modulated on the principle of minimum displacement using a Gaussian filter. In this type of modulation known as GMSK (Gaussian Minimum Shift Keying) the base band signal is presented for transmission in the form of a succession of signals while being periodically examined at a modulation frequency that is constant, with a symbol having a phase which is any one of the multiples of $\pi/2$, ignoring inter-symbol interference.

Although this form of modulation thus has four phase states, it is used in the system under consideration to convey binary information, with the phase difference between two successive signals being restricted to $+\pi/2$ or $-\pi/2$. The binary base band signal is consequently frequently translated on reception so as to have only two phase states: 0 and $\pi$.

After such frequency translation, the base band signal is demodulated and sampled at a sampling frequency which is at exactly the same ratio relative to the local signal frequency as the modulation frequency relative to the carrier frequency.

The phase of a sample is constituted by the sum of the phase shifts due to the modulation (0 or $\pi$) plus the synchronization phase shift which is proportional to the frequency difference that is to be evaluated. In addition, all of the samples have the same modulus.

Thus, one known way of evaluating the synchronization phase shift is to raise a sample to the square, thereby eliminating its modulation phase shift.

A method commonly employed consists in adding together the squares of a first series of samples to produce a first vector and then to repeat this operation for a second series having the same number of samples so as to produce a second vector. The angular difference between these two vectors divided by the time interval between the middles of these two series thus makes it possible to obtain the frequency difference.

This solution is very sensitive to noise and to inter-symbol interference.

An object of the present invention is thus to provide a circuit for evaluating the frequency difference between a local signal and a receive signal that is capable of taking up a plurality of states, the performance of the circuit being significantly improved both relative to noise and relative to inter-symbol interference, as can be seen from simulation results given below. The invention is applicable, for example, to correcting the frequency of a local oscillator.

SUMMARY OF THE INVENTION

The present invention provides a circuit for evaluating the frequency difference between a local signal and the carrier wave of a receive signal which are close together in frequency, the receive signal having been subjected to phase state modulation by a modulation signal and thus having a phase that includes a transmission phase shift, a modulation phase shift corresponding to one of a plurality of phase states; and a synchronization phase shift due to the frequency difference to be evaluated, the circuit including a demodulator unit for producing samples of the receive signal from which the transmission phase shift has been eliminated, wherein the circuit includes means for detecting the modulation phase shift of the samples in order to eliminate it, means for producing the mean phase of a series of samples, and means for producing the frequency difference to be evaluated on the basis of the mean phase of at least two series of samples and on the basis of the time interval between the middles of the series.

In addition, the circuit for evaluating frequency difference includes a control unit receiving an information signal identifying those samples which constitute a part of each of the series and producing a first control signal at the moment a signal appears belonging to any one of the series.

Further, the circuit for evaluating frequency difference includes a gate for providing an output signal constituted by one of the samples in response to the first control signal.

In an embodiment of the circuit for evaluating frequency difference, the modulation comprises two phase states: zero and $\pi$; with the means for detecting the modulation phase shift being a sign detector producing an invert signal N if the modulation phase shift of the output signal is $\pi$.

Advantageously, the circuit for evaluating frequency difference comprises a sign changing circuit producing a synchronization signal whose value is equal to the value of the output signal or to its inverse, depending on whether the invert signal is absent or present, respectively.

In addition, in the circuit for evaluating frequency difference, if some of the samples correspond to known bits that are identified by the information signal, the control unit produces a second control signal at the moments when one of the samples corresponds to a known bit, together with a modify signal if the phase of the known bit is $\pi$, and a multiplexer circuit produces a sign-change signal which takes the value of the invert signal or of the modify signal depending on whether the second control signal is absent or present, respectively, and a sign-change circuit producing a synchronization signal whose value is the value of the output signal or of its inverse, depending on whether the sign-change signal is absent or present, respectively.

Further, the circuit for evaluating frequency difference includes an accumulator producing an accumulation signal whose value is the sum of the successive values of the synchronization signal, the accumulator being reset to zero before the beginning of each series of samples.

Similarly, the circuit for evaluating frequency difference includes both a selector circuit which transmits the accumulation signal to a first register during a first state of a select signal identifying the last sample of a first sample series and to a second register during a second state of the select signal identifying the last sample of a second sample series, the select signal being produced by the control unit, and an evaluator circuit producing the frequency difference on the basis of the mean phase of the first series from the first register and the mean phase of the second series from the second register.

For example, in the circuit for evaluating frequency difference, the receive signal comes from transmission equipment in a digital cellular radiocommunications system and is organized into time intervals that convey speech or data, with first and second sample series corresponding respectively to first and second portions of one such time interval under consideration minus its guard sequence.

BRIEF DESCRIPTION OF THE DRAWING

An embodiment of the invention is described by way of example with reference to the accompanying drawing, in which.

DETAILED DESCRIPTION

Figure 1:
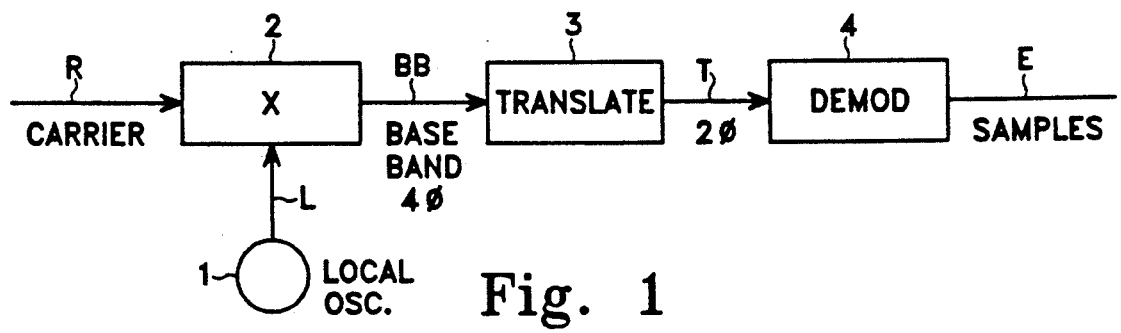
FIG. 1 is a block diagram of an input stage to a receiver implementing the invention.

The invention is initially described in the context of a specific application, namely to the digital cellular radiocommunication system described in the recommendations of the GSM as published by the CEPT (European Conference of Posts and Telecommunications Administrations). The circuit for evaluating the frequency difference is installed in a mobile terminal which is considered in the present circumstances as being a receiver. The input stage of the receiver is summarized in the diagram of FIG. 1.

The receiver receives a receive signal R containing digital information built up from bits by a transmitter referred to as a "base station". This signal is modulated in base band at a modulation frequency by two signals that are in phase quadrature, and it may therefore represented by a complex vector.

The receiver includes a local oscillator 1 which produces a local signal L at a frequency which differs from the carrier frequency of the receive signal by $\Delta f$. The receiver further includes a base band transposition circuit 2 to produce a base band signal BB whose frequency is equal to the difference between the frequency of the receive signal R and the frequency of the local signal L. The circuit 2 is followed by a frequency translation circuit 3 which transforms the base band signal BB having four phase states (multiples of $\pi/2$) into a translated signal T having two phase states (0, $\pi$).

A demodulator circuit and appropriate filters 4 produce samples Ei of the translated signal T at a sampling frequency fe. The ratio of said sampling frequency to the local signal is equal to the ratio of the modulation frequency to the frequency of the receive signal. A number n of these samples are centered on the real axis in the complex plane by eliminating the transmission phase shift between the base station and the receiver due, in particular, to propagation time. It is assumed that the samples all have the same modulus and this modulus is taken as being equal to one by definition, thus enabling the samples to be represented by the following equation:

$$Ei = \exp j \cdot (2\pi \cdot \Delta f \cdot (i - \tfrac{1}{2}n) \cdot Te + k \cdot \pi + \phi ii) \qquad (1)$$

where k takes a value of zero or one, i is an integer in the range zero to n, Te is the sampling period, and $\phi ii$ is an interference phase shift due to inter-symbol interference.

The phase $\phi i$ of a sample Ei appears as the sum of a modulation phase shift $\phi mi$, plus a synchronization phase shift $\phi si$, and an interference phase shift $\phi ii$:

$$\phi mi = 0 \text{ or } \pi$$

$$\phi si = 2\pi \Delta f (i - \tfrac{1}{2}n) \cdot Te$$

with $-\tfrac{1}{4}\pi < \phi ii < \tfrac{1}{4}\pi$ because of the type of modulation and the transmission channel.

To evaluate the frequency difference $\Delta f$ it is necessary to recover the synchronization phase shift $\phi si$ from the phase of an arbitrary sample, which requires:

$$\phi sn < \tfrac{1}{4}\pi \text{ or } \phi so > -\tfrac{1}{4}\pi$$

$$\Delta f < 1/(4 \cdot n \cdot Te)$$

Figure 2:
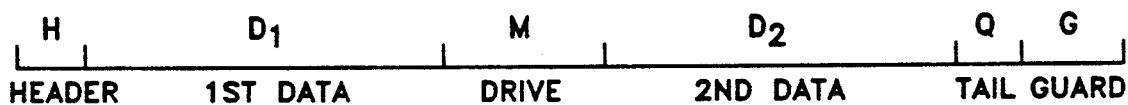
FIG. 2 is a diagram showing the structure of a receive signal as received by the circuit of the invention.

The frequencies of the receive signal R and of the local signal L are therefore considered as being "close" if they satisfy this equation.

n, i.e. the number of samples used for performing the measurement, is selected as now explained. The data conveyed by the receive signal R is structured into frames, each frame comprising eight time intervals or "packets". One such packet conveying speech or data is shown in FIG. 2 and comprises, in succession:

a header sequence H constituted by three samples corresponding to known bits;

a first data sequence D1 comprising 58 samples;

a midamble sequence M constituted by 26 samples corresponding to known bits;

a second data sequence D2 comprising 58 samples;

a tail sequence Q constituted by three samples corresponding to known bits; and a guard sequence G constituting the remainder of the packet.

By convention, a one bit corresponds to a sample whose modulation phase shift is $\pi$, whereas a zero bit corresponds to a sample whose modulation phase shift is zero.

The samples taken into consideration are all of the samples in a packet except for the guard sequence, n = 148.

The sampling period is very close to the modulation period which is 3.69 $\mu$s.

In this case the frequency difference must not exceed about 500 Hz, i.e. 0.2% of the modulation frequency.

Such 0.2% accuracy is easily obtained during presynchronization stages that take place when a call is set up by means of a frequency control channel (FCH) and a synchronization channel (SCH).

Figure 3:
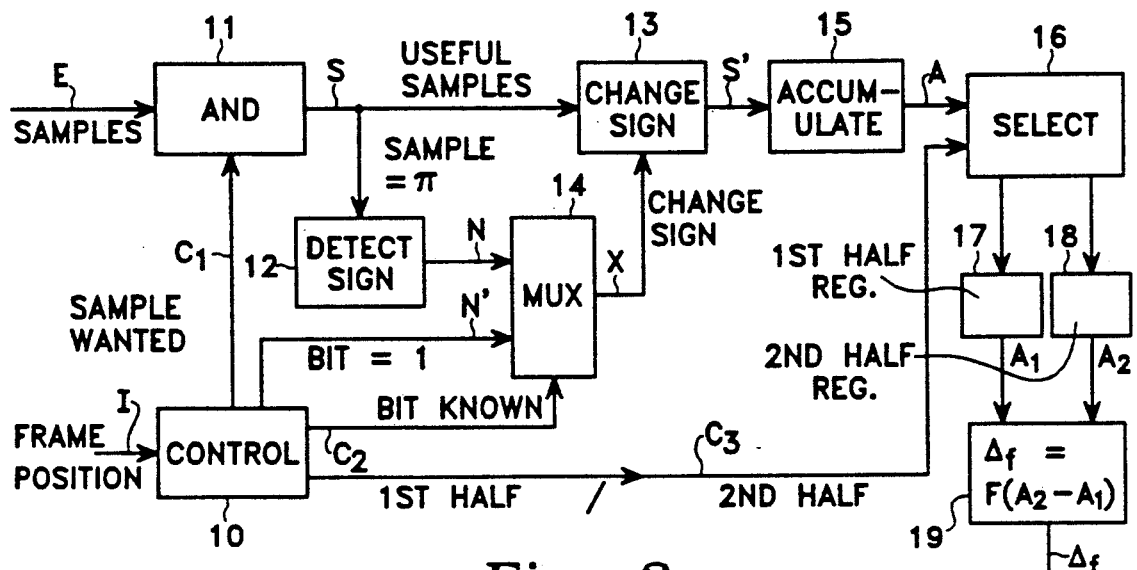
FIG. 3 shows a block diagram of an embodiment of a circuit of the invention.

Now that the various characteristics of the signals to be processed have been described, the circuit for evaluating frequency difference is now described with reference to FIG. 3.

The circuit of the invention eliminates the modulation phase shift in each sample by changing the sign thereof if its modulation phase shift is equal to $\pi$. The phase of each sample is thus reduced to the synchronization phase shift and the interference phase shift.

The circuit adds together the first $\frac{1}{2}n$ samples to be processed in this way. The result of this addition thus constitutes a first vector whose phase is given by:

$$-2\pi\Delta F \cdot \tfrac{1}{2}n \cdot Te + \Delta\phi ii1$$

where $\Delta\phi ii1$ is the resultant interference phase shift due to the various interfering phase shifts.

The circuit then adds together the following $\frac{1}{2}n$ samples. The result of this addition provides a second vector having the same modulus as the preceding vector but whose phase is:

$$2\pi\Delta f \cdot \tfrac{1}{2}n \cdot Te + \Delta\phi ii2$$

where $\Delta\phi ii2$ is the resultant interference phase shift due to the various interfering phase shifts.

The resultant interference phase shifts $\Delta ii1$ and $\Delta\phi ii2$ are considered as being negligible given the accuracy required in the evaluation of frequency difference. In addition, the first and second series of samples may be selected in such a manner as to reduce such resultant interference phase shifts. They are described herein as being constituted respectively as the sequence of $\frac{1}{2}n$ first samples and sequence of $\frac{1}{2}n$ following samples merely to clarify the explanation. However, the person skilled in the art will have no difficulty in transposing the method to series that include a different number of samples and that begin in different positions within a packet.

Thus, the difference between the first and second vectors gives a phase P as follows:

$$P = 2\pi\Delta f \cdot \tfrac{1}{2}n \cdot Te$$

or for known P:

$$\Delta f = P/(\pi \cdot n \cdot Te) \qquad (2)$$

Provision is also made to avoid changing the sign of samples that correspond to bits which are known to be positive, thereby limiting errors due to the transmission chain.

In the embodiment shown, the circuit comprises a control unit 10 which receives an information signal I generated by the receiver informing the control circuit of the beginning of a packet and the order number of the sample within the packet, which control circuit stores in a memory the positions and the values of known bits. The control circuit produces:

a first control signal C1 whenever the sample present at the output from the receiver is to be taken into account, i.e. whenever the sample constitutes one of the first 148 samples in a packet;

a second control signal C2 whenever the sample corresponds to a known bit;

a modify signal N' if the known bit is equal to one; and a select signal C3 that takes a first state on the 74th sample being present and a second state on the 148th sample being present.

The circuit includes a gate 11 that transmits the sample E it receives from the receiver to its output S whenever the control signal C1 is present.

The circuit includes a sign detector 12 which produces an invert signal N if the modulation phase shift $\phi m$ of the sample under consideration is $\pi$, which can be detected by a negative real portion of the complex vector, as can be seen from equation (1).

The circuit further includes a sign-change circuit which produces a synchronization signal S' taking the value of the output signal S or its inverse depending on whether or not a sign-change signal X is absent or present, respectively.

The sign-change signal X is produced by a multiplexer circuit 14 which takes the value of the invert signal N or of the modify signal N' depending on whether the second control signal C2 is absent or present, respectively.

The frequency difference evaluating circuit further includes an accumulator 15 which produces an accumulation signal A whose value is equal to the sum of the various synchronization signals S' successively applied thereto. This accumulator 15 is reset to zero when it has counted the first $\frac{1}{2}n$ samples and when it has counted the following $\frac{1}{2}n$ samples, even though this feature is not shown in the figure.

A selector circuit 16 receives this accumulation signal A and transmits it either to a first register 17 or to a second register 18 depending on whether the select signal C3 is in its first state or in its second state, respectively.

An evaluation circuit 19 calculates the phase P of the difference between the contents of the second register 18 and the first register 17. The frequency difference $\Delta f$ is calculated using above-specified equation (2).

Means (not shown) for resetting the register to zero may also be provided.

There follows a description of the results of a simulation comparing the frequency difference evaluating circuits of the invention with a prior art circuit that operates by raising samples to the square.

These simulations reproduce propagation conditions as defined by the GSM. Thus, upstream from the frequency difference evaluating circuit, the following items are modelled:

GMSK modulation on transmission;

a transmission radio channel connecting the base station to the receiver;

transposition into base band;

frequency translation; and demodulation and appropriate filtering.

The GSM specifies that the circuit must operate with a signal to noise ratio of not less than 6 dB. In the context of Recommendation 05.05, it also specifies the following radio transmission channel models which are known as "profiles":

a direct line of sight profile where a single transmitted ray is taken into account, this profile being called profile 1;

an undulating terrain profile where six distinct transmission rays are taken into account, this profile being called profile 2; and an urban profile where six transmission rays are also taken into account, with this profile being called profile 3.

The following table shows the probability of making an error of more than 250 Hz when evaluating the frequency difference under two different circumstances where the real frequency difference is either 0 Hz or 250 Hz, and when using the circuit of the invention or the prior art circuit.

|  |  | Signal to noise ratio | | | |
| --- | --- | --- | --- | --- | --- |
|  |  | 6 dB | | 10 dB | |
|  |  | Frequency difference | | | |
|  |  | 0 Hz | 250 Hz | 0 Hz | 250 Hz |
| Circuit | Profile 1 | 0.2% | 4% |  |  |
| of the | Profile 2 | 0.15% | 6% | 0.04% | 1% |
| invention | Profile 3 | 0.15% | 2% | 0.05% | 1% |
| Prior art | Profile 1 | 12% | 15% |  |  |
| circuit | Profile 2 | 10% | 12% | 2.5% | 3% |
|  | Profile 3 | 10% | 10% | 2% | 2.5% |

It can be seen from these results that the circuit of the invention provides better performance than the prior art circuit. This improvement is greatest with decreasing signal to noise ratio and with decreasing frequency difference to be evaluated.

The embodiment described should be considered merely as an example and not as any kind of limitation on the invention. Numerous other embodiments are possible and depending on the technology used they may make use of a hard-wired circuit or of a program run by a processor.

The essence of the invention consists in acquiring the mean synchronization phase shift of a first series of samples and then of a second series of samples, with the difference between these two phase shifts being compared with the difference between the time periods during which these series occurred.

It is not, in fact, essential to provide the components of the circuit for re-establishing the sign of samples that correspond to known bits. The invention is applicable when there are no known bits, in which case the invert signal N is directly connected to the sign-change circuit 13 instead of the sign change signal X, and the multiplexer circuit 14, the second control signal C2, and the modify signal N' are not required.

In general, the invention applies to a receive signal that is modulated by an arbitrary number of phase states. The receive signal is necessarily analyzed by a demodulator unit whose function is specifically to regenerate the phase state that the signal had on transmission, taking account of any disturbances introduced by transmission, such as propagation phase shift.

The demodulator unit does not necessarily include a filter and it produces an output signal that may be sampled.

The samples delivered to the frequency difference circuit of the invention are thus classified depending on their original phase states. Their phases may be analyzed as being the sum of a demodulation phase shift (corresponding to the phase state), plus a synchronization phase shift and an interference phase shift.

Under such circumstances the circuit includes means for eliminating the modulation phase shift from each of the samples.

The samples processed in this way provide the synchronization signal S' of the invention and are then processed as described above.

The evaluation circuit operate˜ correctly so long as the frequency difference is such that for a given phase a sample cannot take up more than one phase state. In modulation using k phase states, with evaluation taking placing while n samples appear spaced apart at the sampling period Te, the closeness condition on the frequencies of the receive signal and of the local signal is given by:

$$\Delta f \leq 1/(k \cdot n \cdot Te)$$

ignoring idler-symbol interference.

In the embodiment described, the circuit of the invention generates the mean phase shift of a first series of samples and then of a second series of samples, and it takes the difference between the results obtained in this way. These two series contain the same number of items. The invention is also applicable to evaluating a frequency difference on the basis of more than two series of samples, with intermediate results possibly being obtained using the method described on two particular series, and with the intermediate results subsequently being processed so as to produce the frequency difference.

It is not essential for each series to contain the s&ne number of samples. It is merely necessary to normalize the modulus of each vector obtained by adding together the samples of each series.

We claim:

1. A circuit for evaluating a frequency difference between a local signal and the carrier wave of a receive signal which are close together in frequency, the receive signal having been subjected to phase state modulation by a modulation signal and thus having a phase shift that includes a transmission phase shift, a modulation phase shift corresponding to one of a plurality of phase states, and a synchronization phase shift due to said frequency difference, said circuit comprising a demodulator unit for producing samples of said receive signal from which said transmission phase shift has been eliminated, means responsive to the demodulator unit for detecting said modulation phase shift of said samples in order to eliminate said modulation phase shift, means for producing a mean phase of a series of said samples, and means for producing said frequency difference on the basis of said means phase of at least two series of said samples and on the basis of a time interval between middles of said series.

2. A circuit for evaluating a frequency difference between a local signal and the carrier wave of a receive signal which are close together in frequency, the receive signal having been subjected to phase state modulation by a modulation signal and thus having a phase the includes a transmission phase shift, a modulation phase shift corresponding to one of a plurality of phase states, and a synchronization phase shift due to said frequency difference, said circuit comprising a demodulator unit for producing samples of said receive signal from which said transmission phase shift has been eliminated, means responsive to the demodulator unit for detecting said modulation phase shift of said samples in order to eliminate said modulation phase shift, means for producing a mean phase of a series of said samples, means for producing said frequency difference on the basis of said means phase of at least two series of said samples and on the basis of a time interval between middles of said series, and a control unit receiving an information signal for identifying those of said samples which constitute a part of each of said series and producing a first control signal whenever one of said samples appears that belongs to any one of said series.

3. A circuit for evaluating frequency difference according to claim 2, further comprising a gate for providing an output signal constituted by one of the samples in response to said first control signal.

4. A circuit for evaluating frequency difference according to claim 3, wherein said modulation comprises two phase states: zero and $\pi$; and said means for detecting the modulation phase shift is a sign detector producing an invert signal N if the modulation phase shift of said output signal is $\pi$.

5. A circuit for evaluating frequency difference according to claim 4, further comprising a sign-changing circuit producing a synchronization signal whose values is equal to the value of said output signal or to its inverse, depending on whether said invert signal is absent or present, respectively.

6. A circuit for evaluating frequency difference according to claim 4, wherein some of said samples correspond to known bits that are identified by said information signal, said control unit produces a second control signal at the moments when one of said samples corresponds to a known bit, together with a modify signal if the phase of said known bit is $\pi$, and the circuit further comprises a multiplexer circuit for producing a sign-change signal which takes the value of said invert signal or of said modify signal depending on whether said second control signal is absent or present, respectively, and a sign-change circuit producing a synchronization signal whose value is the value of said output signal or of its inverse, depending on whether said sign-change signal is absent or present, respectively.

7. A circuit for evaluating frequency different according to claim 5, further comprising an accumulator for producing an accumulation signal whose value is the sum of the successive values of said synchronization signal, said accumulator being reset to zero before the beginning of each of said series of samples.

8. A circuit for evaluating frequency difference according to claim 7, further comprising a selector circuit which transmits said accumulation signal to a first register during a first state of a select signal identifying the last sample of a first one of said sample series, and to a second register during a second state of said select signal identifying the last sample of a second one of said sample series, said select signal being produced by said control unit, and an evaluator circuit which produces said frequency difference on the basis of the mean phase of said first series from said first register and the mean phase of said second series from said second register.

9. A circuit for evaluating a frequency difference between a local signal and the carrier wave of a receive signal which are close together in frequency, the receive signal having been subjected to phase state modulation by a modulation signal and thus having a phase that includes a transmission phase shift, a modulation phase shift corresponding to one of a plurality of phase states, and a synchronization phase shift due to said frequency difference, said circuit comprising a demodulator unit for producing samples of said receive signal from which said transmission phase shift has been eliminated, means responsive to the demodulator unit for detecting said modulation phase shift of said samples in order to eliminate said modulation phase shift, means for producing a mean phase of a series of said samples, and means for producing said frequency difference on the basis of said means phase of at least two series of said samples and on the basis of a time interval between middles of said series, wherein said receive signal comes from transmission equipment in a digital cellular radiocommunications system and is organized into time intervals that convey speech or data with first and second ones of said sample series corresponding respectively to first and second portions of one of said time intervals under consideration minus its guard sequence.

* * * * *